(12) United States Patent
Wangrud

(10) Patent No.: US 8,188,869 B2
(45) Date of Patent: May 29, 2012

(54) KITS AND METHODS FOR MONITORING AND TRACKING ANIMALS

(76) Inventor: Carole A. Wangrud, Oklahoma City, OK (US)

( * ) Notice: Subject to any disclaimer, the term of this patent is extended or adjusted under 35 U.S.C. 154(b) by 0 days.

(21) Appl. No.: 12/871,388

(22) Filed: Aug. 30, 2010

(65) Prior Publication Data

US 2010/0321182 A1    Dec. 23, 2010

Related U.S. Application Data

(63) Continuation-in-part of application No. 12/072,590, filed on Feb. 27, 2008, now Pat. No. 7,821,406.

(60) Provisional application No. 60/903,614, filed on Feb. 27, 2007.

(51) Int. Cl.
*G08B 23/00* (2006.01)

(52) U.S. Cl. ............... 340/573.1; 340/573.2; 340/573.3; 340/573.4; 340/539.13

(58) Field of Classification Search .... 340/573.1–573.4, 340/539.13
See application file for complete search history.

(56) References Cited

U.S. PATENT DOCUMENTS

| | | | |
|---|---|---|---|
| 4,333,072 A | 6/1982 | Beigel | |
| 5,166,676 A | 11/1992 | Milheiser | |
| 5,423,056 A | 6/1995 | Linquist et al. | |
| 5,963,132 A | 10/1999 | Yoakum | |
| 6,067,018 A | 5/2000 | Skelton et al. | |
| 6,095,915 A | 8/2000 | Geissler et al. | |
| 6,172,640 B1 | 1/2001 | Durst et al. | |
| 6,271,757 B1 * | 8/2001 | Touchton et al. | 340/573.1 |
| 6,524,199 B2 | 2/2003 | Goldman | |
| 6,581,546 B1 | 6/2003 | Dalland et al. | |
| 6,720,879 B2 | 4/2004 | Edwards | |
| 6,888,464 B1 | 5/2005 | Maloney | |
| 7,129,833 B2 | 10/2006 | Albert | |
| 7,136,869 B2 | 11/2006 | Holcombe et al. | |
| 7,315,760 B2 | 1/2008 | Brodnick et al. | |
| 7,602,302 B2 * | 10/2009 | Hokuf et al. | 340/573.3 |
| 2002/0196151 A1 | 12/2002 | Troxler | |
| 2004/0246126 A1 | 12/2004 | Pitts | |
| 2005/0250440 A1 | 11/2005 | Zhou et al. | |
| 2007/0008150 A1 | 1/2007 | Hassell | |
| 2007/0011339 A1 | 1/2007 | Brown | |

OTHER PUBLICATIONS

"A Critique of Wildlife Radio-tracking and its Use in National Parks", USGS, Northern Prairie Wildlife Research Center, pp. 1-9, Aug. 3, 2006.
Carms, B.C., "In Situ Sensors, Sensor Networks and Webs—Industry and Market Overview", pp. 1-58, Jun. 2006.
Gossett, S., "GPS implant makes debut", WorldNetDaily, pp. 1-3, Feb. 16, 2008.

* cited by examiner

*Primary Examiner* — Brent Swarthout
(74) *Attorney, Agent, or Firm* — Dunlap Codding, P.C.

(57) ABSTRACT

A kit monitoring and tracking the location of at least one animal includes a GPS implant designed to be transplanted subcutaneously into an animal, and capable of communicating spatial information related to the location of the animal. A first receiver allows the user to receive the spatial information communicated from the GPS implant and related to the location of the animal. The first receiver is adapted to transmit the spatial information communicated from the GPS implant to a smartphone.

8 Claims, 6 Drawing Sheets

KITS AND METHODS FOR MONITORING AND TRACKING ANIMALS

CROSS REFERENCE TO RELATED APPLICATIONS

This application is a continuation-in-part of U.S. patent application Ser. No. 12/072,590 filed Feb. 27, 2008 now U.S. Pat. No. 7,821,406, which claims the benefit of U.S. Provisional Application No. 60/903,614, filed Feb. 27, 2007, both of which are hereby expressly incorporated herein in their entirety.

STATEMENT REGARDING FEDERALLY SPONSORED RESEARCH OR DEVELOPMENT

Not applicable.

BACKGROUND

1. Field of the Invention

The presently disclosed and claimed inventive system(s), kit(s), apparatus(es) and method(s) relate to tracking animals and, more particularly, but not by way of limitation, to kits, systems and methods utilizing a GPS device inserted subcutaneously into animals including domesticated or wild animals. More particularly, the presently disclosed and claimed inventive system(s), kit(s), apparatus(es) and method(s) relate to using GPS implants to monitor the location of animals including, but not limited to, pets and livestock, to provide notification if the location of a pet or livestock is outside an allowable zone, and to monitor and study the migratory patterns of wildlife, birds and aquatic animals.

2. Background of the Invention

In the pet and the commercial livestock industries, constant care and oversight of animals is a task administered by a person charged with the care and oversight of those animals. For pets, the owner or caregiver can inhibit the movement of those pets by keeping them caged or confined indoors. However, it is considered beneficial and preferred by many owners to allow their pets to roam about a property with more freedom to exercise as well as safeguard a larger outdoor property. Still, pet owners constantly must concern themselves with monitoring the location of their pets, both for the purposes of safety of the pets and for the safety of any third parties that may come into contact with the pets.

Similarly, in the commercial livestock industry, it is desirable to monitor the location of one's stock for many reasons. First, if a member of the livestock is sick, the owner or caregiver must provide constant supervision. Second, in rural habitats, predators may attack or run the livestock away from normal habitats. Third, if a member escapes its confined or fenced-in area, the member is a risk to, and at risk from, outside hazards such as moving vehicles. Considering the high value of livestock that is bred to specification and/or fills a niche for the market, it is understandably important to know the whereabouts of the livestock.

Current systems of monitoring animals are inadequate. Though video monitoring of animals may provide more information if the animals are in the planned habitat, the efficacy of any system that is fixed upon a planned habitat is negated if a member of the livestock or the pet escapes or otherwise leaves the planned habitat. A number of solutions involve GPS monitoring of animals through placing a transmitter on a collar or tag. This system, while accomplishing a more complete monitoring of animals, leaves unaddressed the common scenario of collars and tags becoming detached from the animal.

Another area involving animal tracking and monitoring is the study of wildlife. Research teams have attached GPS transmitters to birds and other animals in an effort to provide information on habits and migration routes. However, the use of GPS collars and other attachments have had harmful effects on the animals. For example, the transmitter packages can impair movement by becoming snagged in vegetation, animals themselves have become entangled in loose collars or harnesses, birds endure chaffing or feather loss, and aquatic fish and animals experience increased drag when swimming.

Thus, it can be seen that there is a continued need for animal owners and wildlife researchers to monitor pets, livestock and wildlife in a manner that is more widespread than its planned habitat. There is also a need to track pets and livestock if they escape the planned habitat. It can further be seen that an approach is needed to provide central database services to the two industries of pet care and commercial livestock which will monitor if the animals breach a predetermined perimeter and report such information to the owners in real-time.

SUMMARY OF THE INVENTION

Embodiments of the presently claimed and disclosed invention are directed to a kit and method for monitoring and tracking the location of at least one animal. The kit includes a GPS implant designed to be transplanted subcutaneously into an animal, and capable of communicating spatial information related to the location of the animal. A first receiver allows the user to receive the spatial information communicated from the GPS implant and related to the location of the animal. The first receiver is adapted to transmit the spatial information communicated from the GPS implant to a smartphone.

A method for monitoring and tracking the location of an animal includes the following steps. A GPS implant is inserted subcutaneously into the animal. The GPS implant communicates information relating to the location of the animal through a satellite system to a first receiver in communication with a smartphone. A memory of the smartphone is provided with data defining an allowable zone for the animal. Using a processor of the smartphone, the received GPS implant location information is compared against the data defining an allowable zone to determine if the animal is within the allowable zone. Response signal(s) are generated and sent when it is determined that the animal is outside the allowable zone.

A location monitoring program, loadable onto the smartphone, includes a set of instructions that when executed by the smartphone, causes the smartphone to display the location of the GPS implant on a display screen of the smartphone.

Further, movements of wild animals such as migratory movements of birds, or the study of any and all aquatic life, can be monitored using the system of the present invention. Additionally, the GPS implant can be in a form to be ballistically implanted into the wildlife, thereby avoiding the need for capture of the animal and manual insertion of the GPS implant.

These and other features, aspects and advantages of the present invention will become better understood with reference to the following drawings, description and claims. For a better understanding of the invention, its operating advantages and the specific objects attained by its uses, reference should be made to the accompanying drawings and descriptive matter in which there are illustrated preferred embodiments of the invention. The foregoing has outlined some of the more pertinent aspects of the invention. These aspects should be construed to be merely illustrative of some of the more prominent features and applications of the present invention. Many other beneficial results can be attained by applying the disclosed invention in a different manner or by modifying the invention within the scope of the disclosure. Accordingly, other aspects and objects may be discerned from a fuller understanding of the invention and the detailed description of the preferred embodiments in addition to the scope of the invention illustrated by the accompanying drawings.

DETAILED DESCRIPTION OF THE INVENTION

Figure 1:
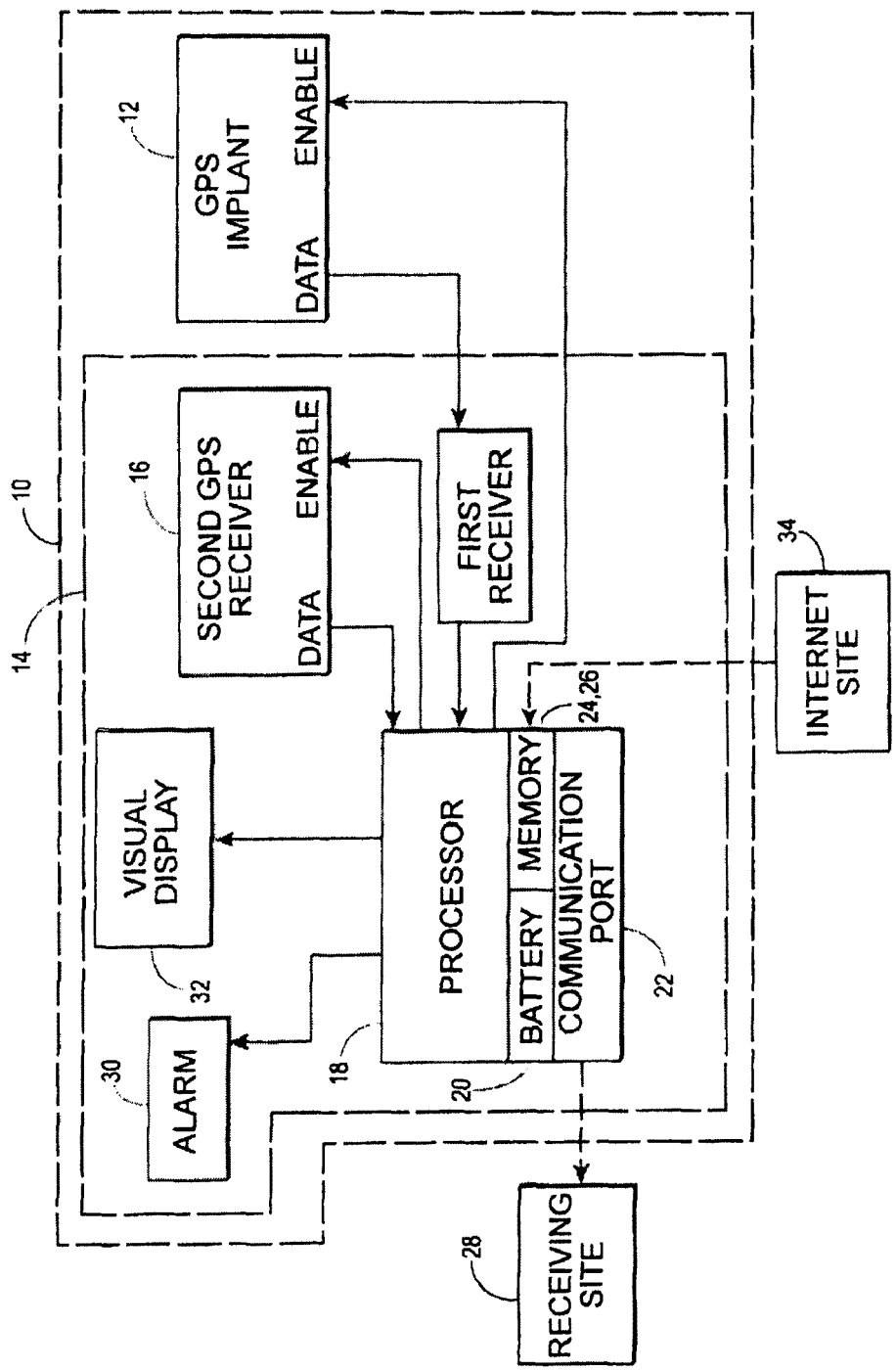
FIG. 1 is a simplified schematic representation of a system for monitoring the location of an animal in accordance with the presently disclosed and claimed inventive system(s), kit(s), apparatus(es) and method(s).

Before explaining the invention in detail, it is to be understood that the invention is not limited in its application to the details of construction, experiments, exemplary data, and/or the arrangement of the components set forth in the following description or illustrated in the drawings. The invention is capable of other embodiments or of being practiced or carried out in various ways. Also, it is to be understood that the phraseology and terminology employed herein is for purpose of description and should not be regarded as limiting.

Pet owners and commercial livestock owners desire a system to monitor their animals that is durable, consistent and capable of providing instant and continuous flow of information. The system should not be capable of detaching from the animal through rough play or attack or malfunctioning through other exposure to natural elements such as weather. A system must be capable of solving the problem of communicating information regarding the animals' location to the owners and any other party that needs to have instantaneous access to such information.

Referring now to FIG. 1, a location monitoring system 10 of the present invention includes a GPS implant 12 and a portable locating device 14. In contrast to previous attempts to track animals, a GPS implant 12 is transplanted subcutaneously into an animal and therefore remains embedded in the animal, avoiding the possible detachment or malfunction of a conventional GPS receiving device that is attached to the exterior of an animal, its collar or tag. GPS implant 12 receives GPS signals from which the implant's coordinates can be determined. Spatial information related to the location of the animal can be communicated to the first receiver 15 of the portable locating device 14. For example, the GPS implant can compute its coordinates and transmit these coordinates to the first receiver 15 of the portable locating device 14. Alternatively, the GPS implant may function to transmit the GPS signals to the first receiver 15 of the portable locating device 14 which can compute the coordinates of the GPS implant.

The term "GPS implant" is used herein to refer to any device that can be inserted subcutaneously or otherwise within a living body and whose location can be tracked using Global Positioning Satellite technology. The GPS implant can be an encapsulated implant including an antenna, a signal transmitter, a controller, and a power source such as a battery, or it can include an element for receiving and storing energy such as a capacitor. Previous implant systems known to those skilled in the art and available commercially have used implanted passive electronic devices that emit a radio frequency when activated by a scanner. More recently, efforts to reduce the physical dimensions of GPS units have led to manufacture of units that can be transplanted subcutaneously or otherwise within a living body.

To reduce the size of the GPS implant, recent transcutaneous recharging systems such as those used for full-implantable middle ear hearing devices can be employed. An induction-based power recharging system similar to the recharging systems developed for implantable pacemakers can be used. In one embodiment, the GPS implant includes neither a battery nor an element for storing energy but rather energy is induced into the antenna and used to power the controller and generate and transmit the signal. Examples of such implants are described in U.S. Pat. Nos. 5,963,132 and 4,333,072, for example.

Other examples of suitable GPS implants include the implantable personal location device developed by Applied Digital Solutions. The induction-based power-recharging method used by Applied Digital Solutions is similar to that used to recharge implantable pacemakers and requires no physical connection between the power source and the implant.

In other embodiments, the GPS implant can be in a form to be implanted mechanically such as with a dosing gun, or ballistically such as with an airgun. Thus, either hand-held implant administration or ballistic implantation can be utilized. If the system is used for tracking and monitoring wildlife, ballistic implantation can be particularly useful. Ballistic implantation airguns and methods are known to those skilled in the art and are described in, for example, International Patent Publication No. WO 2006/017308 A1.

The portable locating device 14 can include a second GPS receiver 16 for receiving GPS signals indicating the coordinates and location of the portable locating device 14. The spatial information relating to the location of the animal and the GPS implant 12, and the spatial information relating to the location of the portable locating device 14 can be received and transmitted continuously or, in an effort to conserve energy, can be received and transmitted periodically or upon request. For example, the portable locating device 14 can enable the GPS implant to communicate spatial information every 5 minutes.

The portable locating device 14 can include a processor 18, battery 20, and a communication port 22. The processor 18 can be, for example, a microprocessor or controller for which the use and construction are well known to those skilled in the art. Processor 18 utilizes a memory 24 which provides the storage substrate for a location monitoring program 26. The communication port 22 provides the ability to communicate externally via wired or wireless means to a receiving site 28.

Figure 3:
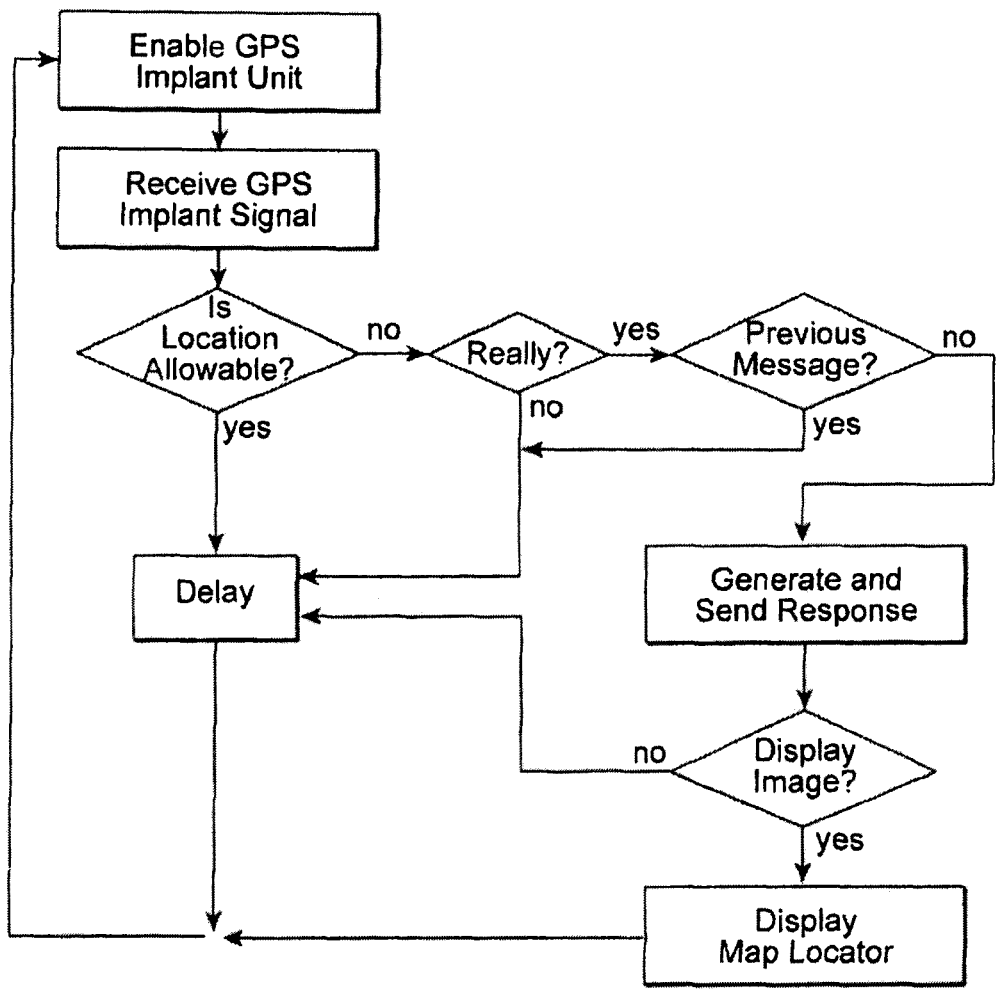
FIG. 3 is a simplified schematic representation of a method for monitoring the location of animals within a control perimeter and reporting events to owners, in accordance with the presently disclosed and claimed inventive system(s), kit(s), apparatus(es) and method(s).
Figure 4:
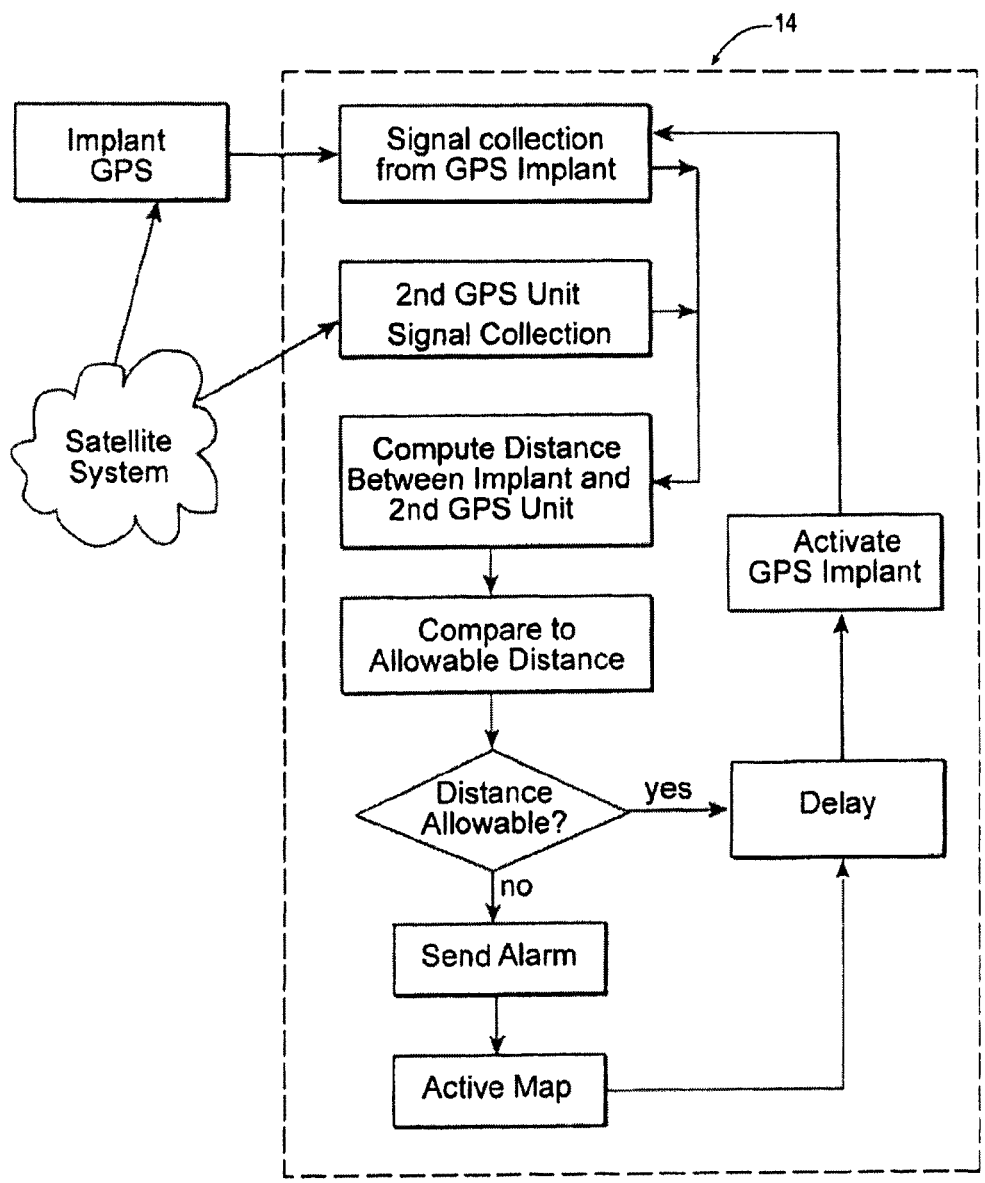
FIG. 4 is a simplified schematic representation of a method for monitoring animals within a predetermined distance and reporting to owners, in accordance with the presently disclosed and claimed inventive system(s), kit(s), apparatus(es) and method(s).

In one mode, the location monitoring program 26 instructs the processor 18 to compare the location of the GPS implant 12 to a predetermined allowable zone wherein the predetermined allowable zone is defined by perimeter data input by the user. As shown in FIG. 3, if the GPS implant 12 is within the predetermined allowable zone, then after an optional delay, location coordinates are again received and compared. If it is determined that the GPS implant is outside the predetermined allowable zone, the processor 18 generates and sends response signals out the communication port 22. In one embodiment, the portable locating device 14 can connect to a standard phone system or to the Internet in a wired or wireless manner to send an alert or message to the animal owner, caregiver, or other designee. For example, the portable locating device 14 may connect through an RJ-11 jack to a phone system to deliver the alert or message. Alternatively, the portable locating device 14 can send a text message alert via Short Message Service to a wireless device such as a mobile phone, pager, Blackberry™, and the like. Response signals can be sent to an external receiving site 28 through a broadband Internet connection, or an alert delivered to a monitoring service or an Internet site comprising a network operating center monitoring service. Such a monitoring service can then send user-defined messages to alert the user or other care giver.

Figure 2:
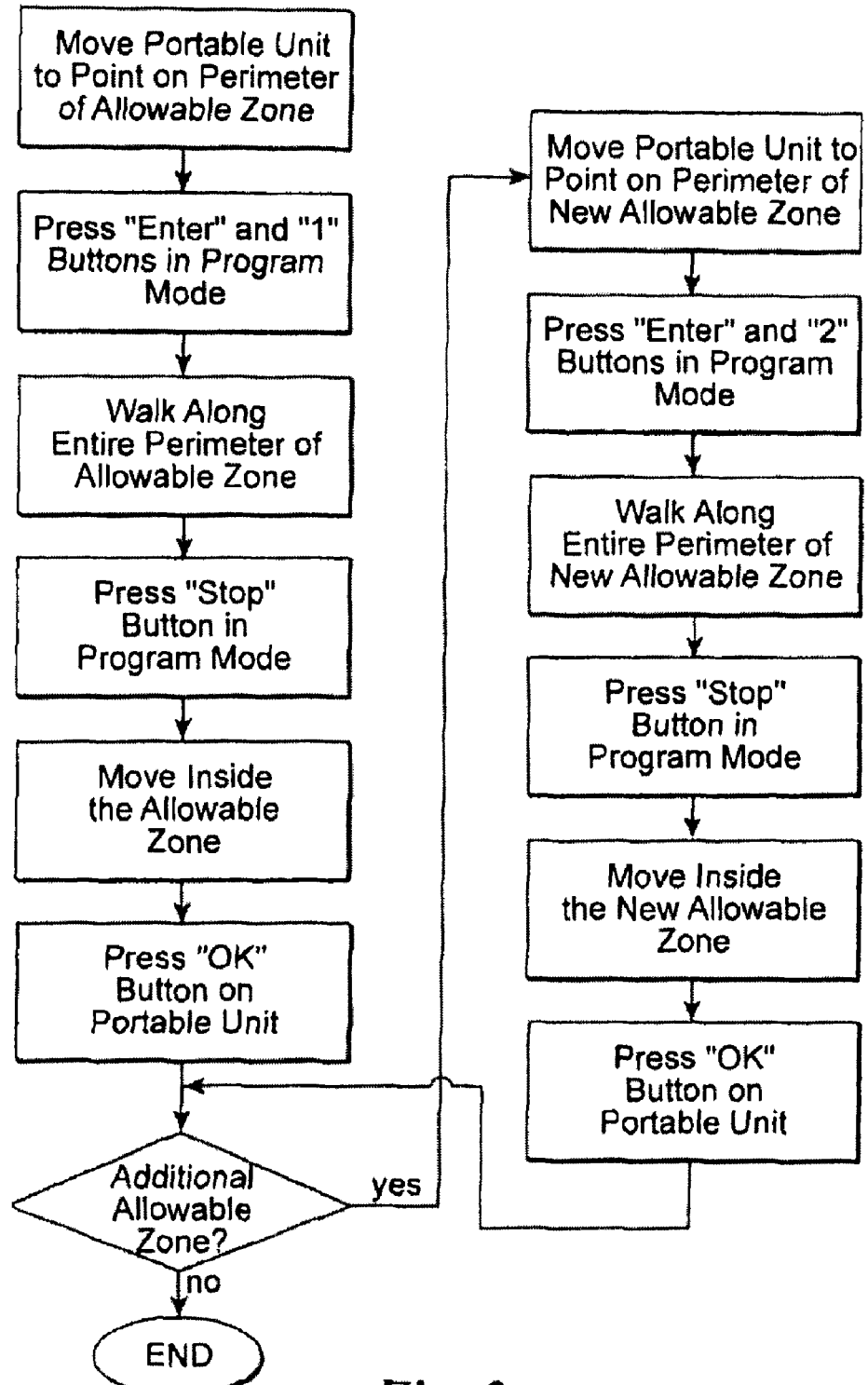
FIG. 2 is a simplified schematic representation of a method for establishing and programming a confinement perimeter.

The user can also define a confinement perimeter using the second GPS receiver 16 of the portable locating device 14 for receiving GPS signals from a GPS source such as positional satellites. As outlined in FIG. 2, in a perimeter programming mode, the user can move to a point along the perimeter and press "ENTER" and "1" buttons on the locating device. GPS signals representing the coordinates of portable locating device 14 are received by the device and stored in memory 24. The user can walk along the perimeter while the portable locating device 14 continuously or periodically receives GPS signals representing its coordinates. Once the entire perimeter is traversed and recorded, the user can, for example, press an "OK" or "END" button on the portable locating device 14 and the device will stop recording. Multiple zones can be defined and stored in memory 24 in the same manner.

The portable locating device 14 can use the GPS receiver 16 for tracking its own location and comparing that location to the location of the GPS implant 12. In this mode, the user can define the allowable zone as a predetermined distance between the GPS implant 12 and the portable locating device 14. For example, if the user wishes to walk the animal unleashed, the user can manually enter an allowable distance between the GPS implant 12 and the portable locating device 14. The user can then either carry the portable locating device 14 or let it remain at a fixed location. Once the animal strays more than the allowable distance from the portable locating device, the device can, for example, sound an alarm 30, or otherwise alert the user in a customized manner.

The portable locating device can be used to find the animal by activating a visual display 32. By using the visual display 32 and activating a mapping mode, the location of the animal or GPS implant can be shown on a map, signals for which are stored in memory 24 and displayed on the visual display 32. Maps can optionally be downloaded or updated from an Internet site 34. In one embodiment, the visual display 32 can provide a split screen showing a mapped location of the GPS implant along side a mapped location of the portable location device.

Figure 5:
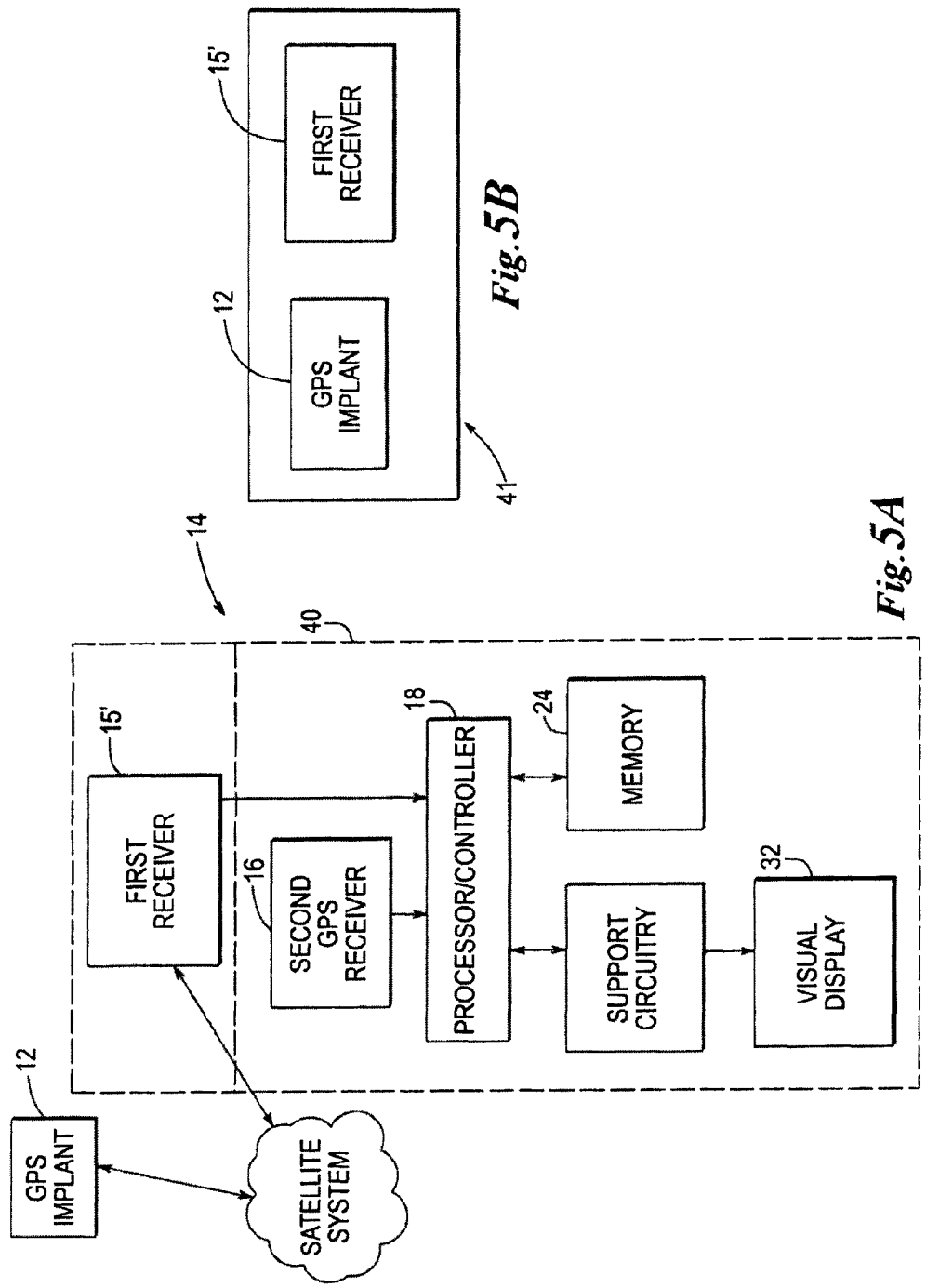
FIG. 5A is a simplified schematic representation of a system for monitoring the location of an animal using a smartphone and a kit in accordance with the presently disclosed and claimed inventive system(s), kit(s), apparatus(es) and method(s).
FIG. 5B is a simplified schematic representation of a kit for monitoring the location of an animal in accordance with the presently disclosed and claimed inventive system(s), kit(s), apparatus(es) and method(s).

In one embodiment, shown in FIGS. 5A and 5B, the portable locating device 14 comprises the first receiver 15' in communication with a smartphone 40. An advantage of using a first receiver 15' and a smartphone 40 as the portable locating device 14 is that many aspects of the portable locating device are already present in the smartphone, and many people already own a smartphone. Thus, a kit 41 for monitoring and tracking the location of at least one animal need include only the GPS implant 12 and the first receiver 15' adapted to transmit the spatial information communicated from the GPS implant 12 to the smartphone 40. Other advantages include the fact that users generally keep their smartphone with them and can immediately begin the search to find an animal by activating the visual display 32 on their smartphone 40 as described above for the portable locating device 14. Smartphones often come equipped with their own GPS which is usable as the second GPS receiver 16. Smartphones also readily accept applications such as the location monitoring program by loading from a computer or downloading from an Internet site.

Figure 6:
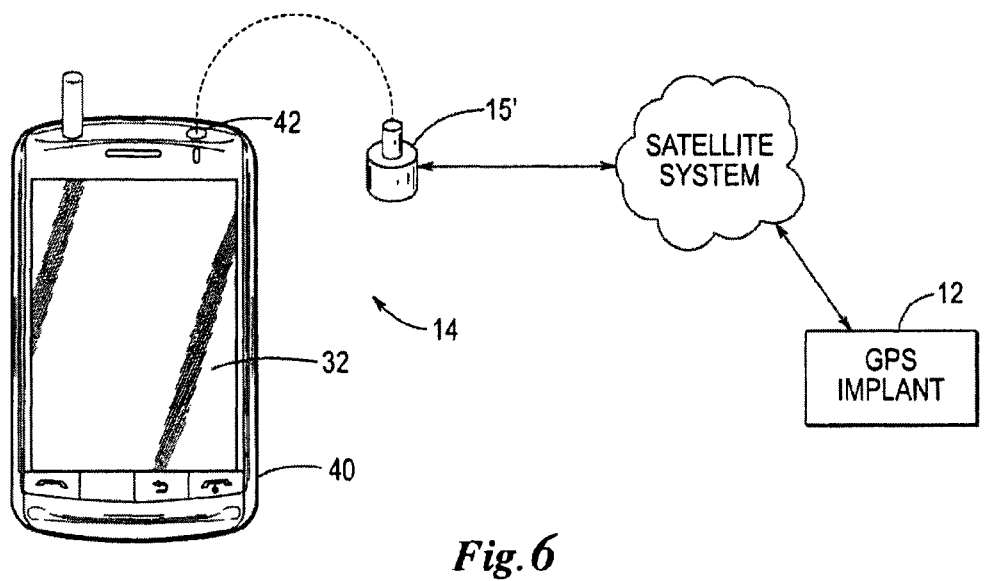
FIG. 6 is a simplified schematic representation of a system for monitoring the location of an animal using a receiver in communication with a smartphone via a headphone or headset jack on the smartphone and in accordance with the presently disclosed and claimed inventive system(s), kit(s), apparatus(es) and method(s).
Figure 7:
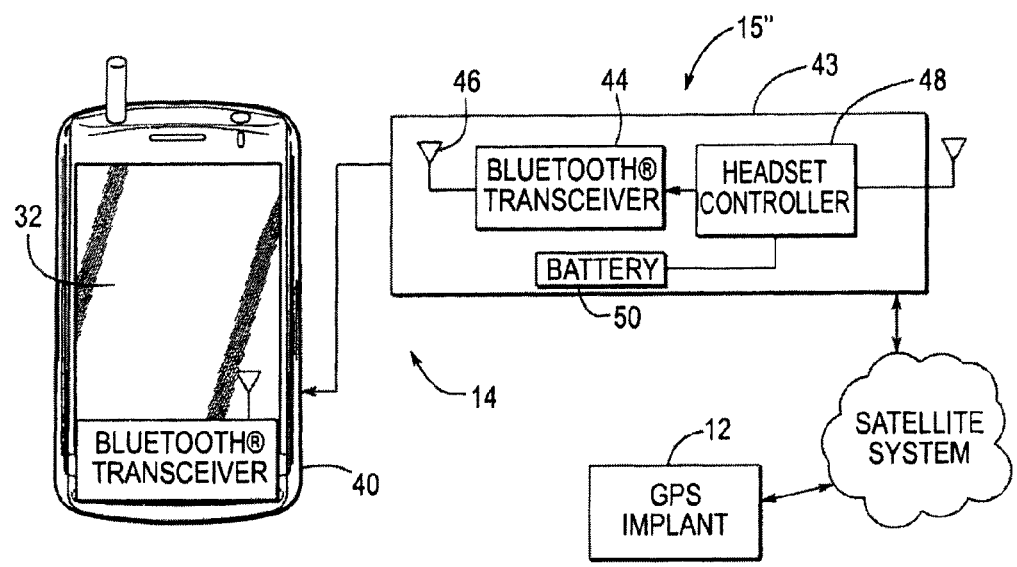
FIG. 7 is a simplified schematic representation of a system for monitoring the location of an animal using a receiver in communication with a smartphone utilizing BLUETOOTH® technology in accordance with the presently disclosed and claimed inventive system(s), kit(s), apparatus(es) and method(s).

A smartphone is defined herein and in the appended claims as a cellular phone that includes computer functions such an operating system and local storage. Users can add and store information and install programs to the smartphone 40. Any cellular phone capable of receiving and interpreting GPS information and displaying that information in map form is considered a smartphone for purposes of this invention. The first receiver 15 is adapted to transmit the spatial information communicated from the GPS implant to the smartphone 40. The first receiver 15 is typically quite small and can readily connect to the smartphone 40 via a 3.5 mm headphone jack or a 2.5 mm headset jack 42 on the smartphone 40 as shown in FIG. 6. The pin connection to the jack 42 on the smartphone 40 can be an integral part of the first receiver 15 or can be connected to the first receiver 15 by a cord. The connection to 3.5 mm headphone jack or 2.5 mm headset jack 42 on the smartphone 40 can also include a splitter configured, as understood by those skilled in the art, to allow the user to listen to, for example, music or voice messages while receiving the spatial information communicated from the GPS implant 12. It is anticipated that the size of the headphone or headset jack could vary in the future and that the pin size connecting the first receiver 15 to the smartphone 40 would be modified accordingly.

In the embodiment shown in FIG. 6, the portable locating device 14 comprises smartphone 40 and a first receiver 15". The first receiver 15" includes a wireless radio transmitter 43 configured to transmit the spatial information communicated from the GPS implant to the smartphone 40 using a headset profile (HSP) of the BLUETOOTH® wireless communications standard as defined by the BLUETOOTH Special Interest Group (SIG) and available at URL address www.bluetooth.org. The spatial information communicated from the GPS implant is transmitted using a BLUETOOTH® transceiver 44 and antenna 46 and communicated to the smartphone 40 according to instructions provided by a headset controller 48. It is often advantageous to use a commercially available headset controller 48, BLUETOOTH® transceiver 44, and antenna 46, powered by a headset battery 50, wherein the electronics are commercially configured and mass-produced for communicating with smartphones 40.

A location monitoring program 26, loadable or downloadable to the memory 24 of the smartphone 40, instructs the processor 18 to compare the location of the GPS implant 12 to the predetermined allowable zone. The allowable zone data can be a default or can be input to the memory of the smartphone by the user as previously discussed. The smartphone is very flexible in terms of allowing the user to modify the allowable zone data and personalize the response signal indicating the at least one animal is outside the allowable zone.

Methods for using the kit 41 for monitoring and tracking the location of an animal include inserting a GPS implant into the animal as previously described. The first receiver receives the location information of the GPS implant and communicates this information to the smartphone. Software necessary to allow communication between the first receiver and the smartphone can be provided, for example, with the first receiver, by downloading from a web site, or by other means as understood by those skilled in the art. The first receiver is activated and connected to the smartphone by, for example, inserting a pin connection to the jack 42 on the smartphone 40 or enabling BLUETOOTH® on the smartphone and positioning the first receiver within range of the smartphone. Monitoring and tracking the location of the animal having the GPS implant then proceeds utilizing the smartphone as described above for the portable tracking device.

An advantage of the present system, kit and methods is that the owner/caregiver can receive information in real time regarding the animal's exact whereabouts. While the discussions above have been directed to companion animals, the systems, devices and methods apply to livestock, wildlife and even people. For example, the system can be used for the study of migratory movements of birds, or the study of any and all aquatic life. The system can also be used by law enforcement when attempting to apprehend a suspected criminal. In this case the animal is a human, and rather than using bullets or a TASER® to apprehend the fleeing human suspect, the officer can instead ballistically insert a GPS implant into the suspect and track the suspect in a less frantic manner. A kit for police work would include a gun for ballistically inserting GPS implants, the GPS implants, and a portable locating device 14 or a first receiver 15 for communicating with a police officer's smartphone 40. In one embodiment, the GPS implants are activated upon leaving the gun or upon ballistic insertion. In another embodiment, the GPS implants are activated remotely using, for example, a radio signal.

As has been demonstrated, the present invention provides an advantageous system that provides an animal owner with a technologically superior means of monitoring animals and of tracking lost animals or those breaching a preset virtual barrier. While the preferred embodiments of the present invention have been described, additional variations and modifications in those embodiments may occur to those skilled in the art once they learn of the basic inventive concepts. Therefore, it is intended that the appended claims shall be construed to include both preferred embodiment and all such variations and modifications as fall within the spirit and scope of the invention.

What is claimed is:

1. A kit for monitoring and tracking the location of at least one animal, the kit comprising:
   a GPS implant designed to be transplanted subcutaneously into an animal, the GPS implant capable of communicating spatial information related to the location of the at least one animal;
   a first receiver for receiving the spatial information communicated from the GPS implant related to the location of the at least one animal, the first receiver adapted to transmit the spatial information communicated from the GPS implant to a smartphone; and
   a location monitoring program loadable onto the smartphone and including a set of instructions, that when executed by the smartphone, causes the smartphone to (a) compare the spatial information communicated from the GPS implant against data entered into a memory of the smartphone, the entered data defining an allowable zone, (b) determine when the at least one animal is outside the allowable zone, (c) communicate response signals when the at least one animal is outside the allowable zone; and to (d) display the location of the GPS implant;
   wherein the allowable zone represents selectively either a user-defined perimeter, or a user-defined allowable distance between the smartphone and the GPS implant; and
   wherein the location monitoring program further comprises instructions, that when executed by a smartphone having a second GPS receiver for receiving spatial information related to the location of the smartphone, (a) cause the smartphone to display the location of the GPS implant and the location of the smartphone in a split screen mode, the mapped location of the GPS implant alongside a second mapped location of the smartphone, and (b) cause the smartphone to receive the smartphone location information while a user transports the smartphone along a perimeter, and to enter the resulting user-defined perimeter data into the memory of the smartphone.

2. The kit of claim 1, wherein the first receiver is adapted to transmit the spatial information communicated from the GPS implant to a headphone or headset jack on a smartphone.

3. The kit of claim 1, wherein the first receiver comprises a wireless radio transmitter configured to utilize BLUETOOTH® headset technology to transmit the spatial information communicated from the GPS implant to a BLUETOOTH® enabled smartphone.

4. The kit of claim 1, wherein the location monitoring program further includes instructions that when executed by the smartphone cause the smartphone to display the location of the GPS implant and the location of the smartphone on a single map.

5. A method for monitoring and tracking the location of an animal, comprising the steps of:
   inserting a GPS implant subcutaneously into the animal, the GPS implant communicating information relating to the location of the animal;
   providing a memory of a smartphone with a location monitoring program loadable onto the smartphone and including a set of instructions, that when executed by the smartphone, causes the smartphone to (a) compare the spatial information communicated from the GPS implant against data entered into a memory of the smartphone, the entered data defining an allowable zone, (b) determine when the at least one animal is outside the allowable zone, (c) communicate response signals when the at least one animal is outside the allowable zone; and to (d) display the location of the GPS implant;

wherein the allowable zone represents selectively either a user-defined perimeter, or a user-defined allowable distance between the smartphone and the GPS implant; and wherein the location monitoring program further comprises instructions, that when executed by a smartphone having a second GPS receiver for receiving spatial information related to the location of the smartphone, (a) cause the smartphone to display the location of the GPS implant and the location of the smartphone in a split screen mode, the mapped location of the GPS implant alongside a second mapped location of the smartphone, and (b) cause the smartphone to receive the smartphone location information while a user transports the smartphone along a perimeter, and to enter the resulting user-defined perimeter data into the memory of the smartphone; and providing the memory of the smartphone with data defining an allowable zone;

receiving the location information communicated by the GPS implant through a first receiver in communication with the smartphone;

using a processor of the smartphone to compare the received GPS implant location information against the data defining an allowable zone to determine if the animal is within the allowable zone; and generating and sending response signal(s) when it is determined that the animal is outside the allowable zone.

6. The method of claim 5, wherein the step of receiving the location information communicated by the GPS implant includes transmission to a headphone or headset jack on a smartphone.

7. The method of claim 5, wherein the first receiver comprises a wireless radio transmitter configured to utilize BLUETOOTH® headset technology, the smartphone is BLUETOOTH® enabled, and the location information communicated by the GPS implant is transmitted from the first receiver to the smartphone using BLUETOOTH® headset technology.

8. The method of claim 5 wherein the GPS implant is inserted ballistically into the animal.

\* \* \* \* \*